(12) United States Patent
Gallagher

(10) Patent No.: US 11,595,720 B2
(45) Date of Patent: Feb. 28, 2023

(54) SYSTEMS AND METHODS FOR DISPLAYING A CONTEXT IMAGE FOR A MULTIMEDIA ASSET

(71) Applicant: Thomas Michael Gallagher, Carpentersville, IL (US)

(72) Inventor: Thomas Michael Gallagher, Carpentersville, IL (US)

( * ) Notice: Subject to any disclaimer, the term of this patent is extended or adjusted under 35 U.S.C. 154(b) by 0 days.

(21) Appl. No.: 17/475,841

(22) Filed: Sep. 15, 2021

(65) Prior Publication Data

US 2022/0095010 A1 Mar. 24, 2022

Related U.S. Application Data

(60) Provisional application No. 63/081,651, filed on Sep. 22, 2020.

(51) Int. Cl.
*H04N 21/439* (2011.01)
*H04N 21/43* (2011.01)
*G06F 16/432* (2019.01)
*G06F 16/483* (2019.01)
*G06F 3/01* (2006.01)

(52) U.S. Cl.
CPC ......... *H04N 21/4394* (2013.01); *G06F 3/017* (2013.01); *G06F 16/433* (2019.01); *G06F 16/483* (2019.01); *H04N 21/4307* (2013.01)

(58) Field of Classification Search
CPC ............ H04N 21/4394; H04N 21/4307; G06F 16/483; G06F 16/433; G06F 3/017
See application file for complete search history.

(56) References Cited

U.S. PATENT DOCUMENTS

| | | | | |
|---|---|---|---|---|
| 2003/0177684 A1* | 9/2003 | Irwin | ...................... | A47G 1/141 40/772 |
| 2007/0060112 A1* | 3/2007 | Reimer | ................... | G06Q 30/06 455/414.2 |
| 2011/0071977 A1* | 3/2011 | Nakajima | .............. | G06F 16/433 715/810 |
| 2014/0282071 A1* | 9/2014 | Trachtenberg | ..... | H04N 21/2668 715/748 |
| 2015/0324832 A1* | 11/2015 | Kaufman | ............... | H04L 67/535 705/14.27 |
| 2015/0379021 A1* | 12/2015 | Kuper | ..................... | G06F 3/165 700/94 |
| 2016/0314794 A1* | 10/2016 | Leitman | ............. | H04N 21/2387 |
| 2017/0034596 A1* | 2/2017 | Newell | .............. | H04N 21/4755 |
| 2017/0193362 A1* | 7/2017 | Cremer | .................... | G06N 3/04 |

* cited by examiner

*Primary Examiner* — Sunghyoun Park

(74) *Attorney, Agent, or Firm* — Husch Blackwell LLP

(57) ABSTRACT

Systems and methods for displaying a context image for a multimedia asset are disclosed. In one embodiment, a system includes a programmable processor, and a display device. In some embodiments, the programmable processor is configured to identify a first multimedia asset being broadcast in a region, determine and retrieve a first context image associated with the first multimedia asset, and direct the display device to display the first context image during the broadcast of the first multimedia asset.

17 Claims, 3 Drawing Sheets

SYSTEMS AND METHODS FOR DISPLAYING A CONTEXT IMAGE FOR A MULTIMEDIA ASSET

CROSS REFERENCE TO RELATED APPLICATIONS

The present application claims priority benefit under 35 U.S.C. § 119(e) to Provisional Patent Application No. 63/081,651 titled "Systems and Methods for Displaying a Context Image for a Multimedia Asset", filed on Sep. 22, 2020, the above-cited provisional application is hereby incorporated by reference in its entirety herein.

FIELD

The present invention relates generally to systems and methods for displaying a context image for a multimedia asset.

BACKGROUND

Known systems and methods for displaying a context image for a multimedia asset, such as an album cover, include displaying the context image on a display of a device that controls playback of the multimedia asset, such as a computer, phone tablet, etc. However, these known systems and methods do not present the context image in an optimally pleasing and unobtrusive view. For example, such known systems and methods display an album cover alongside playback information and/or in a manner where it is immediately clear that the album cover is a digital reproduction.

In view of the above, there is a continuing, ongoing need for improved systems and methods.

DETAILED DESCRIPTION

Figure 1:
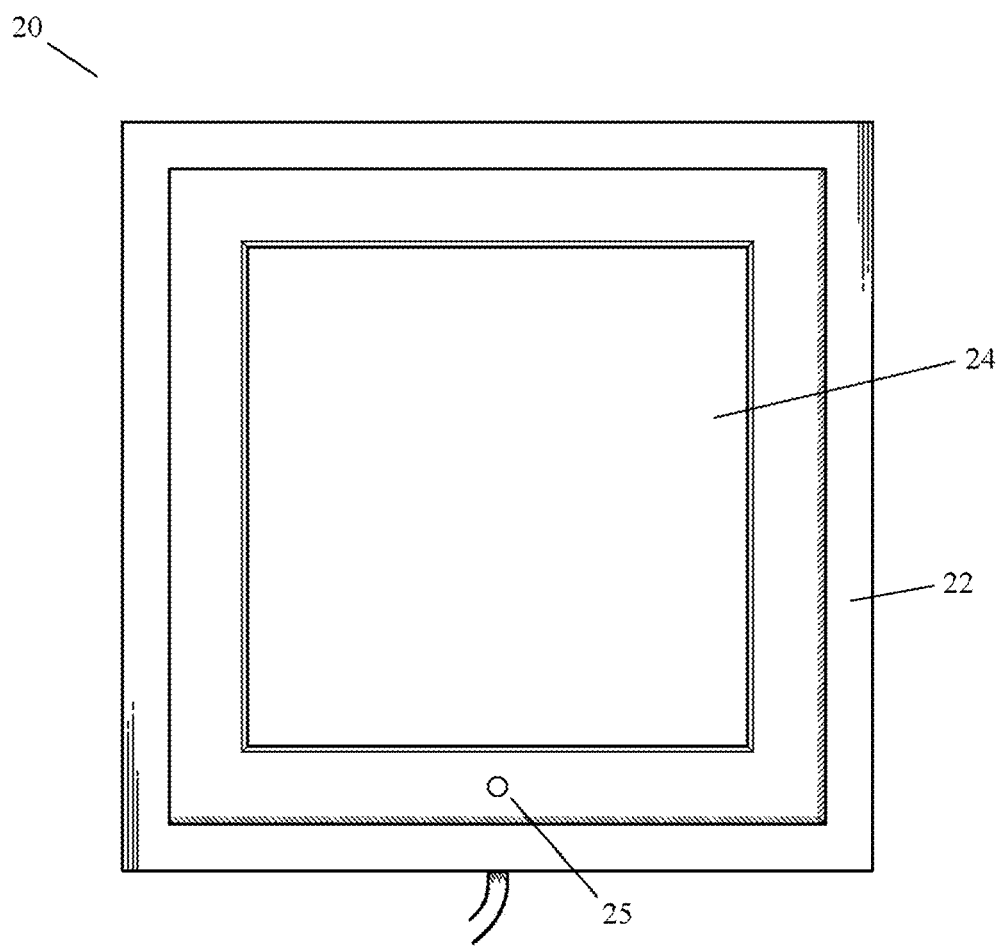
FIG. 1 is a context image display system according to disclosed embodiments.

While this invention is susceptible of an embodiment in many different forms, there are shown in the drawings and will be described herein in detail specific embodiments thereof with the understanding that the present disclosure is to be considered as an exemplification of the principles of the invention. It is not intended to limit the invention to the specific illustrated embodiments.

Embodiments disclosed herein can include systems and methods for identifying when a multimedia asset is being broadcast in a region, retrieving a context image, and displaying the context image on a display device in the region while the multimedia asset is being broadcast. In some embodiments, the multimedia asset can include a music track from a larger musical album release, and the context image can include the album cover art. However, it should be noted that, other embodiments for the multimedia assets and context image are also contemplated.

Figure 2:
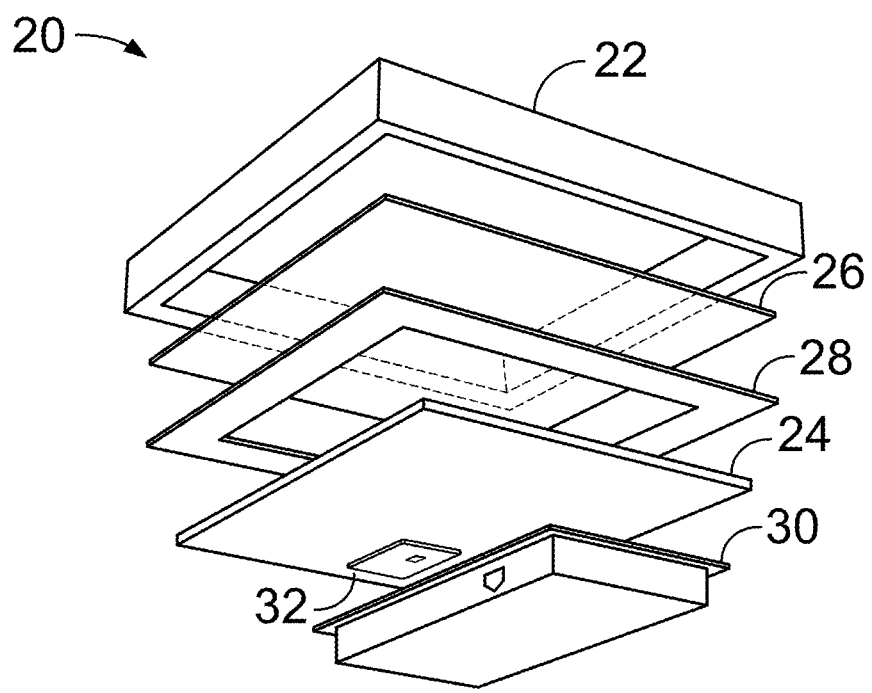
FIG. 2 is an exploded view of a context image display system according to disclosed embodiments.

FIG. 1 shows a context image display system 20 according to disclosed embodiments. As seen in FIG. 1, in some embodiments, the context image display system 20 can be configured to resemble a framed analog album cover. According to an exemplary embodiment, the context image display system 20 can include an enclosure 22, a digital display device 24, and, in some embodiments, a gesture sensor 25. In some embodiments, the context image display system 20 can further include matting that surrounds the digital display device 24. FIG. 2 is an exploded view of the context image display system 20 according to disclosed embodiments. As seen in FIG. 2, in some embodiments, the context image display system 20 can also include a display cover 26, a mat border 28 that covers at least a portion of the display device 24, a power supply and control unit 30 for the display device 24, and a controller board 32. In some embodiments, the controller board 32 can include a programmable processor configured to perform some or all of the methods described herein. As seen in FIG. 2, in some embodiments, the enclosure 22 can include a wooden frame, the display cover 26 can include a plexiglass panel, and the display device 24 can include an LCD panel. Various other embodiments for the display device 24 such as an LED or OLED panel are also contemplated. The controller board 32 can further include a network (wired or wireless) connection card or module to connect to a network and the Internet.

In some embodiments, the enclosure 22 and/or matting 28 can cause the visible portion of the display device 24 to be 12⅜"×12⅜", which is the traditional size of a vinyl LP record jacket. Thus, the displayed image would appear in both size and imagery to be an actual LP album. In some embodiments, the display device 24 can change the displayed image in response to ambient lighting to cause the image to look more authentic in all light. Efforts are made to ensure that the displayed image on the display device 24 does not appear to be a displayed image but instead looks like a framed vinyl album. In some embodiments, the controller board 32 can add layering or other image effects to make the album cover look used or imperfect, thereby adding to the effect that the displayed context image is not a digital representation.

In operation, the controller board 32 can be configured to identify when a first multimedia asset, such as a track from a musical album, is being broadcast audibly in a region in which the context image display system 20 is deployed. When the controller board 32 identifies that the multimedia asset is being audibly broadcast, the controller board 32 can determine and retrieve a preset context image (e.g. the associated album cover) associated with the multimedia asset and direct the display device 24 to display the preset context image during the broadcast of the first multimedia asset. If the multimedia asset has no album cover associated therewith, the controller board 32 can find another associated context image for display, such as an image of the artist. The controller board 32 can access, remotely or locally, a database of context images having metadata that associates the context images with one or more multimedia assets.

In some embodiments, the context image display system 20 can include an ambient condition sensor that transmits an indication of ambient conditions within the region to the controller board 32. In these embodiments, the controller board 32 can be configured to modify a first preset context image or alter settings of the display device 24 based on the indication of the ambient conditions in the region to limit the perception that the first preset context image is a digital reproduction. In some embodiments, the ambient condition sensor can include a light meter. Accordingly, the controller board 32 can direct the display device to increase or decrease brightness based on the level of light (or other ambient conditions) detected by the light meter (e.g. increase image brightness when the brightness level from the light detector increases). In some embodiments, the controller board 32 can be configured to alter the context image through editing, layering additional images, etc. based on a tracked play count of the multimedia asset. For example, in some embodiments, the controller board 32 can be configured to count the number of times that a user plays the multimedia asset and modify the context image to simulate real life wear and tear (e.g. frayed edges) as the play count of the album increases. For example, if the controller board 32 determines that a particular song has been played dozens of times by the same user, the controller board 32 can instruct the display device 24 to display more frayed edges on the context image than a lesser played song. As another example, a song played for the first time can result in a context image displayed with no frayed edges. In some embodiments, the context image modification feature can be turned on or off based on received user input in a control application for the context image display system 20.

Various embodiments for identifying the multimedia asset are contemplated. In some embodiments, the controller board 32 can be configured to receive an indication of the multimedia asset from a playback source such as a streaming service (e.g. Spotify, Apple Music) or local media player. In some embodiments, the indication of the multimedia asset can also include either a copy of the context image or a download link for the context image. For example, in embodiments where the playback source is the streaming service, the controller board 32 can be configured to employ an application program interface (API) for the streaming service to query current playback information from the streaming service via various API calls. In some embodiments, the controller board 32 can receive the context image through the same API call, as the API may return several pieces of data (song playing, album cover, song lyrics, etc.) in response to the API call. In some embodiments, received user input through the control application can authenticate the control application and the controller board 32 to the streaming service via an associated account of the streaming service. Alternatively, the controller board 32 can identify the broadcast multimedia asset by receiving sound data from a microphone, analyzing the sound data, and comparing the sound data to known multimedia assets, which can be accomplished via known song identification services, such as Shazam.

In some embodiments, the control application can be configured to control playback of the multimedia asset by sending commands to the streaming service via the API in response to received user input. In some embodiments, the received user input can include gestures identified by the gesture sensor 25. For example, in some embodiments, a left or right swipe over the gesture sensor 25 can respectively translate into a command to transition to the previous or next song in the album or playlist, and holding a hand in front of the gesture sensor 25 for a predetermined time can pause or resume playback of the multimedia asset. In some embodiments, other customized gestures can be generated via the control application.

In some embodiments, the control application can be configured to operate on a user device such as a mobile phone, tablet, personal computer etc. and can communicate with the controller board 32 via a websocket over a local network or over the Internet. In some embodiments, the controller application can be configured to display the context image as well as additional information about the multimedia asset. For example, in embodiments where the multimedia asset includes the musical album, the control application can show the album cover, album name, song title, and artist. In some embodiments, the controller board 32 can be configured, in response to user input via the controller application and/or the gesture sensor 25, to direct the display device 24 to display at least some of the additional information either superimposed over the context image or on a different background image such as another context image associated with the additional information. For example, in embodiments where the additional information includes lyrics for the multimedia asset, the controller board 32 can be configured to direct the display device 24 to display a retrieved lyric sheet for the multimedia asset. Furthermore, in some embodiments, the control application can be configured to turn the display device 24 on/off and initiate reboots and/or shutdowns of the context image display system 20. In some embodiments, the controller application and/or the controller board 32 can be configured to receive commands from a digital voice assistant system such as those known in the art. In some embodiments, the controller application can be configured to receive user input identifying a default image to display on the display device 24 whenever the controller board 32 fails to identify a multimedia asset being broadcast in the region.

Additionally or alternatively, in some embodiments, the context image display system 20 can include a microphone that together with the controller board 32 can receive sound waves from the region and provide the sound waves to the controller board 32 so that the controller board 32 can identify the multimedia asset from the sound waves. In some embodiments, the controller board 32 can be configured to pass the received sound waves to a remote server and receive the indication of the multimedia asset back as a response. In some embodiments the response can also include the copy of the context image or the download link for the context image. In some embodiments, the control application can pass the received sound waves to a song identifying service, such as Shazam.

Figure 3:
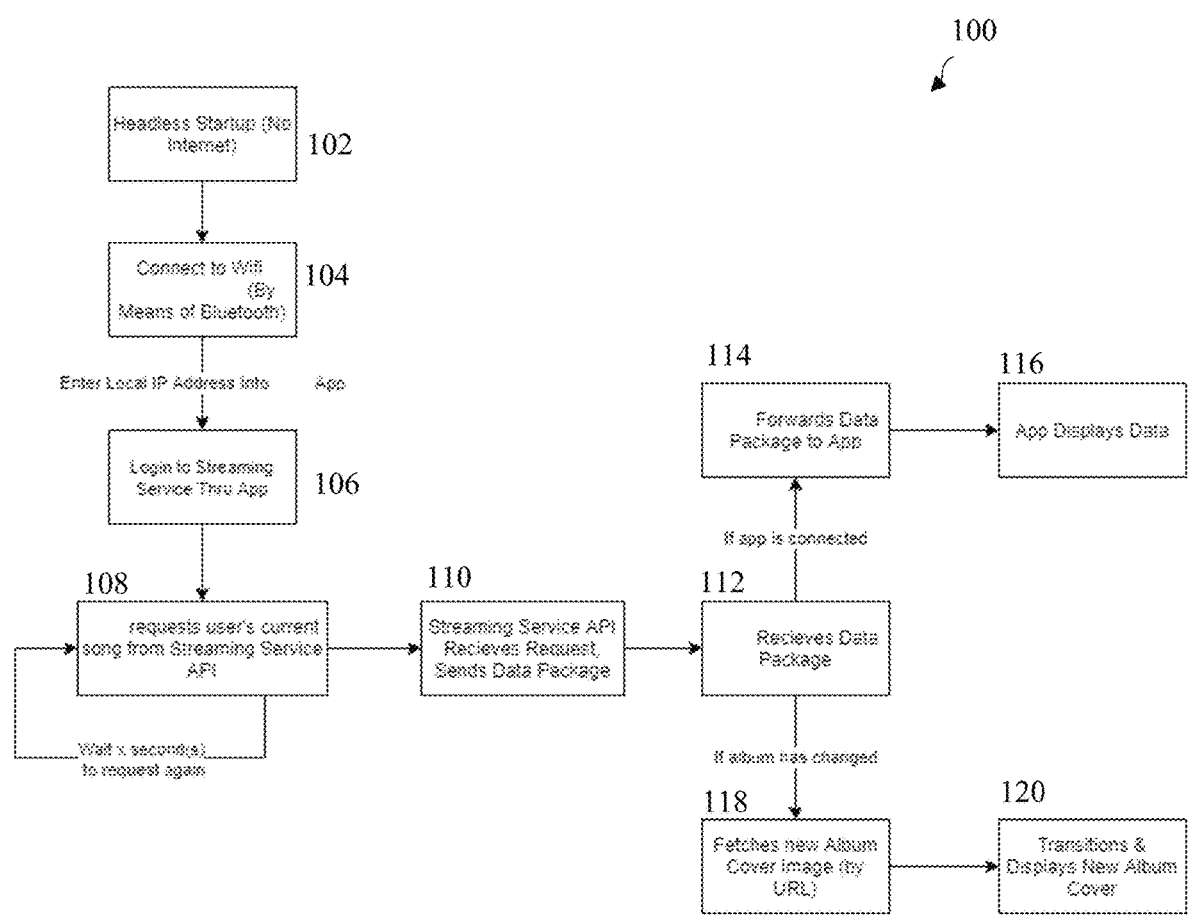
FIG. 3 is a flow diagram of a method according to disclosed embodiments.

FIG. 3 is a flow diagram of a method 100 according to disclosed embodiments. As seen in FIG. 3, in some embodiments, the method 100 can include initiating a headless startup of the controller board 32, as in 102, connecting the controller board 32 to a wireless network, as in 104, and logging into a streaming service via a control application for the controller board 32, as in 106. Then, the method 100 can include the controller board 32 and/or the control application requesting a current song being broadcast from the streaming service, as in 108, the streaming service receiving the request and sending a data package to the controller board 32 and/or the control application, as in 110, and the controller board 32 receiving the data package from the streaming service, as in 112. Next, the method 100 can include, when the controller application is connected, the controller board 32 forwarding the data package to the controller application and the controller application displaying the data from the data package, as in 114 and 116. Finally, the method 100 can include, when the data package indicates that a new album is playing, the controller board 32 and/or the control application fetching the context image for the new album via a URL provided in the data package and transitioning the display device 24 from displaying a previous context image to displaying the new context image, as in 118 and 120. In some embodiments, the context image can remain displayed even if playback of the multimedia asset is paused or stopped. In some embodiments, the context image can remain displayed until a new multimedia asset associated with a new context image is played in the region or until the display device is commanded to turn off.

Although a few embodiments have been described in detail above, other modifications are possible. For example, other components may be added to or removed from the described systems, and other embodiments may be within the scope of the invention.

From the foregoing, it will be observed that numerous variations and modifications may be effected without departing from the spirit and scope of the invention. It is to be understood that no limitation with respect to the specific system or method described herein is intended or should be inferred. It is, of course, intended to cover all such modifications as fall within the spirit and scope of the invention.

What is claimed is:

1. A system comprising:
    a programmable processor; and
    a display device,
    wherein the programmable processor is configured to (a) identify a first multimedia asset being broadcast in a region, (b) determine and retrieve a first context image associated with the first multimedia asset, and (c) direct the display device to display the first context image during the broadcast of the first multimedia asset,
    wherein the programmable processor is further configured to count a number of times that a user plays the first multimedia asset, and
    wherein the programmable processor is further configured to alter the first context image through editing or layering additional images onto the first context image based on the number of times that a user plays the first multimedia asset.

2. The system of claim 1 further comprising an enclosure and matting to surround the display device.

3. The system of claim 2 wherein the enclosure and matting cause a visible portion of the display device to be a traditional size of a vinyl LP record jacket.

4. The system of claim 1 wherein the first multimedia asset is a music track from a larger musical album release, and the context image is album cover art associated with the larger musical album release.

5. The system of claim 1 further comprising a gesture sensor, wherein the gesture sensor is configured to detect body gestures of a person, identify a command associated with a first body gesture, and transmit the command associated with the first body gesture to a device controlling playback of the first multimedia asset.

6. The system of claim 5 wherein the command associated with the first body gesture is a pause command, a play command, a next track command, a previous track command, or a power down command.

7. The system of claim 1 further comprising a light meter that transmits a level of light to the programmable processor, wherein the programmable processor is further configured to direct the display device to increase or decrease a brightness level based on the level of light received from the light meter.

8. The system of claim 1 wherein, when the programmable processor identifies that a second multimedia asset is being broadcast in the region, the programmable processor is further configured to retrieve a second context image for the second multimedia asset and direct the display device to transition from displaying the first context image to displaying the second context image.

9. The system of claim 8 wherein the programmable processor is configured to modify the second context image or alter settings of the display device to limit perception of the second context image as a digital reproduction.

10. The system of claim 1 further comprising a control application executed by a user device, wherein the control application communicates with the programmable processor via a websocket over a local network or over the Internet, and
    wherein the control application can control playback of the first multimedia asset.

11. The system of claim 1 wherein the programmable processor identifies the first multimedia asset being broadcast in the region by receiving an indication of the first multimedia asset from a streaming service, and
    wherein the programmable processor is configured to employ an application program interface (API) for the streaming service to query current playback information from the streaming service via an API call to determine the first multimedia asset.

12. The system of claim 11 wherein the programmable processor is further configured to receive the first context image in response to the API call.

13. The system of claim 12 wherein the programmable processor further receives song lyrics, song title, and album title in response to the API call.

14. The system of claim 1, further comprising a microphone configured to receive sound waves from the region of the first multimedia asset being broadcast in the region and provide the sound waves to the programmable processor,
    wherein the programmable processor is further configured to transmit the sound waves to a remote server and receive an indication of the first multimedia asset as a response.

15. The system of claim 1 further comprising a database of context images having metadata that associates the context images with one or more multimedia assets,
    wherein the programmable processor is further configured to access the database to determine and retrieve the first context image using data indicative of the first multimedia asset.

16. A system comprising:
    a programmable processor;
    a display device; and
    an enclosure and matting to surround the display device,
    wherein the programmable processor is configured to (a) identify a first multimedia asset being broadcast in a region, (b) determine and retrieve a first context image associated with the first multimedia asset, and (c) direct the display device to display the first context image during the broadcast of the first multimedia asset, and
    wherein the enclosure and matting cause a visible portion of the display device to be a traditional size of a vinyl LP record jacket,
    wherein the programmable processor is further configured to count a number of times that a user plays the first multimedia asset, and
    wherein the programmable processor is further configured to alter the first context image through editing or layering additional images onto the first context image based on the number of times that a user plays the first multimedia asset.

17. A method comprising:
    a programmable processor requesting and receiving from a streaming service a first multimedia asset being broadcast in a region and a data packaged associated with the first multimedia asset;
    the programmable processor determining and receiving a first context image for the first multimedia asset being broadcast in the region via information provided in the data package;

the programmable processor commanding a display device to display the first context image until a second multimedia asset associated with a second context image is played in the region or until the display device is commanded to turn off; and the programmable processor altering the first context image through editing or layering additional images onto the first context image based on a number of times that a user plays the first multimedia asset.

\* \* \* \* \*